United States Patent
Ahmed et al.

(10) Patent No.: US 12,106,459 B2
(45) Date of Patent: Oct. 1, 2024

(54) SYSTEM FOR QUANTITIVELY DETERMINING PAVEMENT MARKING QUALITY

(71) Applicant: GM Global Technology Operations LLC, Detroit, MI (US)

(72) Inventors: Fahim Ahmed, Troy, MI (US); Richard Gordon, Canton, MI (US); Donald K. Grimm, Utica, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 456 days.

(21) Appl. No.: 17/547,580

(22) Filed: Dec. 10, 2021

(65) Prior Publication Data

US 2023/0186450 A1    Jun. 15, 2023

(51) Int. Cl.
| | |
|---|---|
| *G06T 7/00* | (2017.01) |
| *G06F 18/22* | (2023.01) |
| *G06F 18/23* | (2023.01) |
| *G06T 7/70* | (2017.01) |
| *G06T 7/90* | (2017.01) |
| *G06V 10/36* | (2022.01) |

(Continued)

(52) U.S. Cl.
CPC ............ *G06T 7/0002* (2013.01); *G06F 18/22* (2023.01); *G06F 18/23* (2023.01); *G06T 7/70* (2017.01); *G06T 7/90* (2017.01); *G06V 10/36* (2022.01); *G06V 10/56* (2022.01); *G06V 10/762* (2022.01); *G06V 10/88* (2022.01); *G06V 20/588* (2022.01); *G06T 2207/10024* (2013.01); *G06T 2207/30168* (2013.01); *G06T 2207/30256* (2013.01)

(58) Field of Classification Search
CPC .......... G06T 7/0002; G06T 7/70; G06T 7/90; G06T 2207/10024; G06T 2207/30168; G06T 2207/30256; G06F 18/22; G06F 18/23; G06V 10/36; G06V 10/56; G06V 10/762; G06V 10/88; G06V 20/588
See application file for complete search history.

(56) References Cited

U.S. PATENT DOCUMENTS

| | | | |
|---|---|---|---|
| 2013/0190981 A1* | 7/2013 | Dolinar | F16M 11/10 348/148 |
| 2020/0294221 A1* | 9/2020 | Oe | G06V 10/507 |
| 2021/0256311 A1* | 8/2021 | Olarig | G06F 18/2148 |

OTHER PUBLICATIONS

Z. Wang, Y. Fan and H. Zhang, "Lane-line Detection Algorithm for Complex Road Based on OpenCV," 2019 IEEE 3rd Advanced Information Management, Communicates, Electronic and Automation Control Conference (IMCEC), Chongqing, China, 2019, pp. 1404-1407, doi: 10.1109/IMCEC46724.2019.8983919. (Year: 2019).*

(Continued)

*Primary Examiner* — Matthew C Bella
*Assistant Examiner* — Janice E. Vaz
(74) *Attorney, Agent, or Firm* — Vivacqua Crane, PLLC

(57) ABSTRACT

A system for quantitively determining quality for pavement markings disposed along pavement on a roadway includes one or more controllers in wireless communication with a plurality of vehicles. The one or more controllers receive image data represents the pavement markings disposed along the pavement collected by the plurality of vehicles. The one or more controllers execute instructions to determine at least one of a color distance measurement between a mean color space value of the pavement markings and an ideal marking color space value and a marking intensity contrast ratio between the pavement markings and the pavement.

20 Claims, 4 Drawing Sheets

(51) Int. Cl.
*G06V 10/56* (2022.01)
*G06V 10/762* (2022.01)
*G06V 10/88* (2022.01)
*G06V 20/56* (2022.01)

(56) References Cited

OTHER PUBLICATIONS

B. Li, D. Song, H. Li, A. Pike and P. Carlson, "Lane Marking Quality Assessment for Autonomous Driving," 2018 IEEE/RSJ International Conference on Intelligent Robots and Systems (IROS), Madrid, Spain, 2018, pp. 1-9, doi: 10.1109/IROS.2018.8593855. (Year: 2018).*

S. Yelmanov and Y. Romanyshyn, "Quantifying the contrast of objects in a complex image," 2020 IEEE 40th International Conference on Electronics and Nanotechnology (ELNANO), Kyiv, Ukraine, 2020, pp. 541-546, doi: 10.1109/ELNANO50318.2020.9088760. (Year: 2020).*

H. H. Handayani and D. Wahiddin, "Digital Image Analysis of Beef Color Using Euclidean Distance Method," 2018 Third International Conference on Informatics and Computing (ICIC), Palembang, Indonesia, 2018, pp. 1-5, doi: 10.1109/IAC.2018.8780457. (Year: 2018).*

\* cited by examiner

SYSTEM FOR QUANTITIVELY DETERMINING PAVEMENT MARKING QUALITY

INTRODUCTION

The present disclosure relates to a system and method for quantitively determining pavement marking quality by determining a color distance measurement between a current marking color and an original or ideal marking color of the pavement markings, and a marking intensity contrast ratio between the pavement and the pavement markings.

Pavement markings may be used to convey messages to roadway users. Specifically, pavement markings may indicate a particular part of the road to use, provide information about conditions ahead, and indicate where passing is allowed. For example, yellow lines separate traffic flowing in opposite directions, while white lines separate lanes for which travel is in the same direction.

Pavement markings wear out over time, and therefore it is necessary for to restripe pavement markings on a regular basis. In some instances, a subjective visual inspection may be used to determine the aesthetic quality acceptance for road marking. However, current quality detection has a qualitative component and does not provide uniform assessment, and therefore this approach results in quality variations that are based on the perception of the specific individual performing the visual inspection. Alternatively, some government agencies and municipalities may restripe pavement markings based on a manual or pre-set schedule instead of the current quality of the pavement markings. There is presently no approach currently available for measuring the deterioration of paint color or visibility contrast of a pavement marking compared to the surrounding pavement material.

Thus, while current pavement marking restriping techniques achieve their intended purpose, there is a need in the art for an approach that objectively determines the current condition of pavement markings.

SUMMARY

According to several aspects, a system for quantitively determining quality for pavement markings disposed along pavement on a roadway is disclosed. The system includes one or more controllers in wireless communication with a plurality of vehicles, where the one or more controllers receive image data represents the pavement markings disposed along the pavement collected by the plurality of vehicles. The one or more controllers execute instructions to convert image frames based on the image data into grayscale image frames, where the grayscale image frames retain data indicating original color space values of the image frames. The one or more controllers execute instructions to create a grayscale filter by providing one or more color masks that isolate only the original color space values representing the pavement markings, and then combining the output of the one or more color masks together. The one or more controllers execute instructions to isolate, by the grayscale filter, the original color space values representing the pavement markings from the grayscale image frames to determine filtered grayscale image frames. The one or more controllers execute instructions to determine a mean color space value corresponding to the pavement markings and the mean color space value corresponding to the pavement based on the filtered grayscale image frames. The one or more controllers execute instructions to determine at least one of a color distance measurement between the mean color space value of the pavement markings and an ideal marking color space value and a marking intensity contrast ratio between the pavement markings and the pavement.

In one aspect, the one or more controllers execute instructions to filter, by a Boolean mask, masked filtered grayscale image frames by assigning binary values to pixels of the filtered grayscale image frames. The pixels representing the pavement are assigned to first binary values and the pixels representing the pavement are assigned to second binary values.

In another aspect, the one or more controllers execute instructions to determine the mean color space value for the pixels of the first binary values representing the pavement markings. The one or more controllers execute instructions to determines the mean color space value for the pixels of the second binary values representing the pavement, and identify a color represented by the mean color space value representing the pavement markings.

In yet another aspect, the one or more controllers identifies boundaries between the pavement markings and the pavement of the filtered grayscale image frames.

In one aspect, the one or more controllers execute instructions to correct the grayscale images frames for brightness to remove discolorations in the image data representing the pavement of the roadway.

In another aspect, the one or more color masks include a first color mask isolating only color space values representing a first color and a second color mask isolating only color space values representing a second color.

In yet another aspect, the first color is yellow and the second color is white.

In one aspect, the marking intensity contrast ratio is determined by $$\text{marking intensity contrast ratio} = \frac{\mu_M - \mu_p}{\mu_p}$$

where $\mu_M$ is a marking intensity and $\mu_p$ is a pavement intensity.

In another aspect, the one or more controllers execute instructions to create a map plotting the color distance measurement of the pavement markings for a specific geographical location, where the map provides a visual indicator where the pavement markings require repainting.

In yet another aspect, the one or more controllers execute instructions to determine the dominant color space values of the pavement markings and the pavement based on the original color space values of the filtered grayscale image frames. The one or more controllers determine a number of clusters each representing a dominant color space value for the pavement markings and the pavement. The one or more controllers determine a Euclidean distance between the mean color space value for each dominant color space value of the pavement markings and the ideal marking color space value.

In an aspect, the pavement markings are lane markings.

In another aspect, a method for quantitively determining quality for pavement markings disposed along pavement on a roadway is disclosed. The method includes receiving, by one or more controllers, image data representing the pavement markings disposed along the pavement collected by a plurality of vehicles. The method also includes converting, by the one or more controllers, image frames based on the image data into grayscale image frames, where the grayscale image frames retain data indicating original color space values of the image frames. The method also includes creating a grayscale filter by providing one or more color masks that isolate only the original color space values representing the pavement markings, and then combining the output of the one or more color masks together. The method further includes isolating, by the grayscale filter, the original color space values representing the pavement markings from the grayscale image frames to determine filtered grayscale image frames. The method also includes determining a mean color space value corresponding to the pavement markings and the mean color space value corresponding to the pavement based on the filtered grayscale image frames. Finally, the method includes determining at least one of a color distance measurement between the mean color space value of the pavement markings and an ideal marking color space value and a marking intensity contrast ratio between the pavement markings and the pavement.

In another aspect, the method includes filtering, by a Boolean mask, masked filtered grayscale image frames by assigning binary values to pixels of the filtered grayscale image frames, where the pixels representing the pavement are assigned to first binary values and the pixels representing the pavement are assigned to a second binary values.

In yet another aspect, the method includes determining the mean color space value for the pixels of the first binary values representing the pavement markings. The method includes determining the mean color space value for the pixels of the second binary values representing the pavement, and identifying a color represented by the mean color space value representing the pavement markings.

In an aspect, the method includes identifying boundaries between the pavement markings and the pavement of the filtered grayscale image frames.

In another aspect, the method includes correcting the grayscale images frames for brightness to remove discolorations in the image data representing the pavement of the roadway.

In yet another aspect, the method comprises determining the marking intensity contrast ratio is determined by $$\text{marking intensity contrast ratio} = \frac{\mu_M - \mu_p}{\mu_p}$$

where $\mu_M$ is a marking intensity and $\mu_p$ is a pavement intensity.

In an aspect, the method comprises creating a map plotting the color distance measurement of the pavement markings for a specific geographical location, where the map provides a visual indicator where the pavement markings require repainting.

In another aspect, the method comprises determining dominant color space values of the pavement markings and the pavement based on the original color space values of the filtered grayscale image frames. The method also includes determining a number of clusters each representing a dominant color space value for the pavement markings and the pavement, and determining a Euclidean distance between the mean color space value for each dominant color space value of the pavement markings and the ideal marking color space value.

In an aspect, a system for quantitively determining quality for lane markings disposed along pavement on a roadway is disclosed. The system includes one or more controllers in wireless communication with a plurality of vehicles, where the one or more controllers receive image data represents the lane markings disposed along the pavement collected by the plurality of vehicles. The one or more controllers execute instructions to convert image frames based on the image data into grayscale image frames, where the grayscale image frames retain data indicating original color space values of the image frames. The one or more controllers create a grayscale filter by providing one or more color masks that isolate only the original color space values representing the lane markings, and then combining the output of the one or more color masks together. The one or more controllers isolate, by the grayscale filter, the original color space values representing the lane markings from the grayscale image frames to determine filtered grayscale image frames. The one or more controllers determine a mean color space value corresponding to the lane markings and the mean color space value corresponding to the pavement based on the filtered grayscale image frames. The one or more controllers determine at least one of a Euclidean distance between the mean color space value of the lane markings and an ideal marking color space value and a marking intensity contrast ratio between the lane markings and the pavement.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1A:
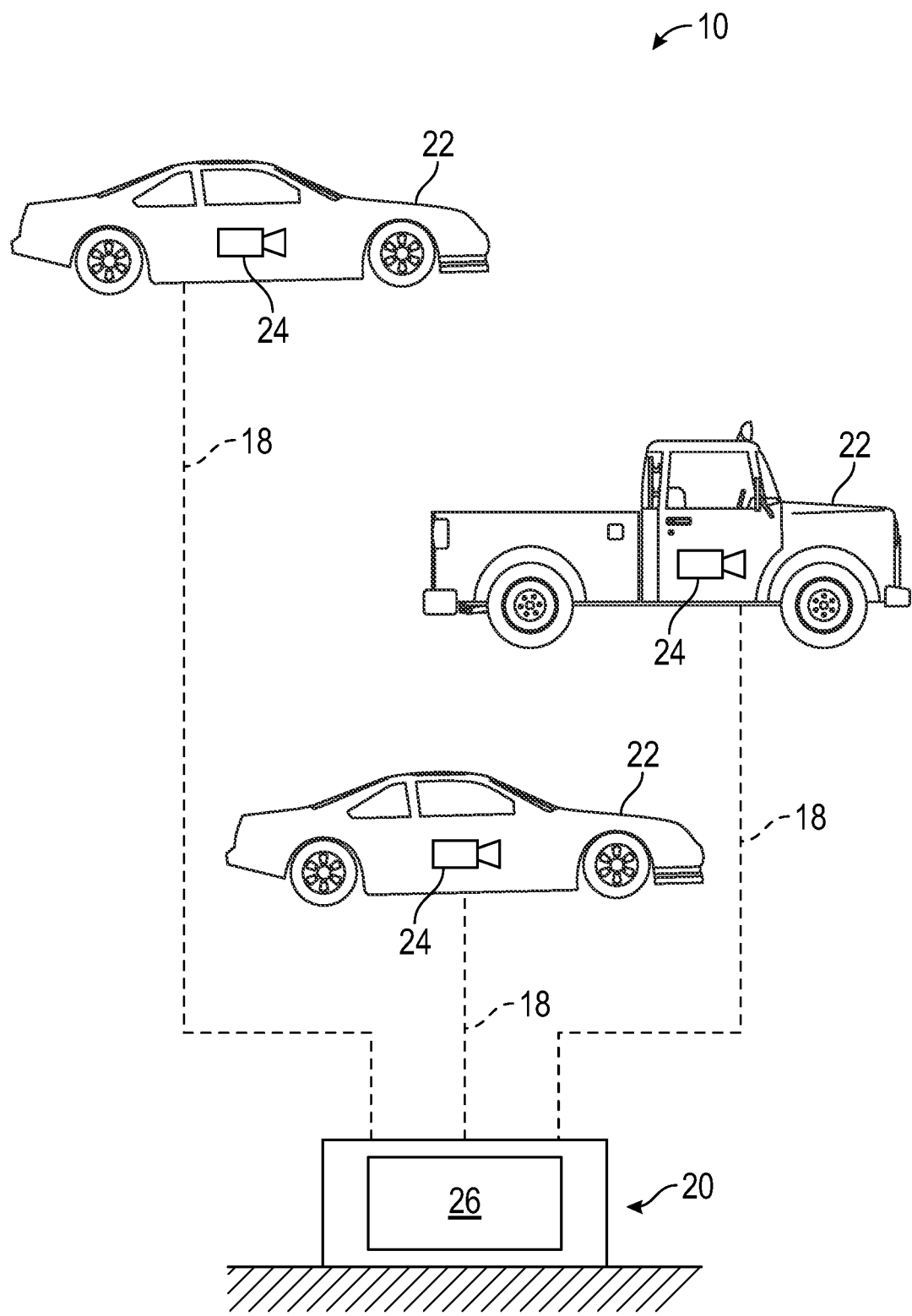
FIG. 1A is a schematic diagram of the disclosed system for quantitively determining quality of pavement markings including a computing system in wireless communication with a plurality of vehicles, according to an exemplary embodiment.
Figure 1B:
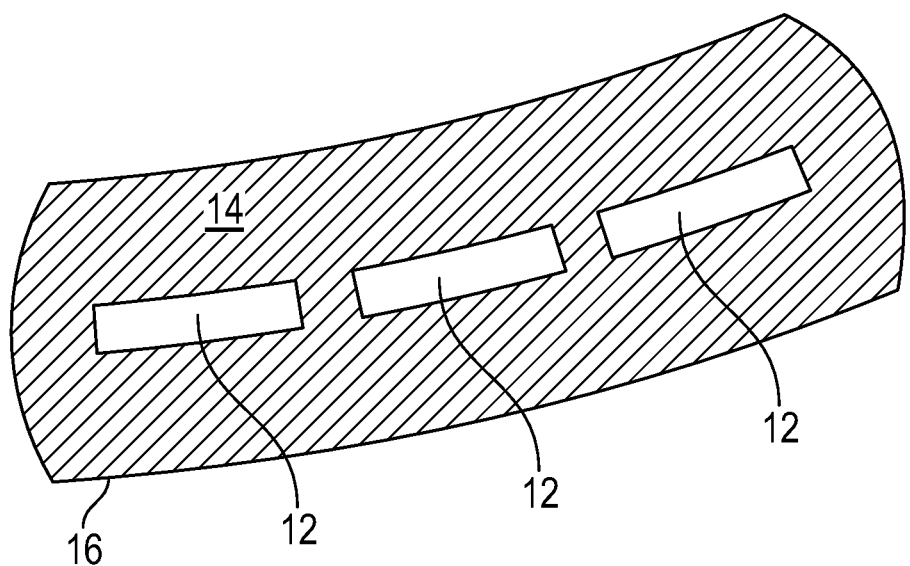
FIG. 1B is a diagram of pavement markings disposed along pavement of a roadway, according to an exemplary embodiment.

Referring to FIGS. 1A and 1B, an exemplary system 10 for quantitively determining a quality of pavement markings 12 disposed along a pavement 14 of a roadway 16 is disclosed. The pavement 14 represents a road surface for vehicular or foot traffic. In the example as shown in FIG. 1B and as described below, the pavement markings 12 are broken or dashed white or yellow lines representing center lane markings. However, it is to be appreciated that the figures are merely exemplary in nature, and the pavement markings 12 are not limited to lane markings and may include other shapes and colors as well. For example, in another embodiment, the pavement markings 12 are symbols such as, for example, a diamond indicating a lane reserved for use by high-occupancy vehicles or a bicycle indicating a lane reserved for bicyclists Furthermore, although pavement markings 12 are described, in an embodiment the system 10 may also be used to determine the quality of road signs such as, for example, stop signs, exit ramp signs, and traffic signs as well.

In the example as shown in FIG. 1A, the system 10 includes a computing system 20 including one or more controllers 26 in wireless communication with a fleet or a plurality of vehicles 22. The one or more controllers 26 receive and aggregate image data 18 collected from the plurality of vehicles 22. The plurality of vehicles 22 may include any type of vehicle having wireless capabilities connected to the computing system 20 such as, but not limited to, a sedan, truck, sport utility vehicle, van, or motor home. Each vehicle 22 includes one or more cameras 24 for capturing the image data 18, where the image data 18 represents the pavement markings 12 disposed along the pavement 14. As explained below, the computing system 20 executes image processing algorithms and quantitative techniques to determine a color distance measurement between a current marking color and an original or ideal marking color, as well as a current pavement color and an ideal pavement color. In an embodiment, the ideal marking color and the ideal pavement colors are based on standards derived from various governmental agencies such as, for example, the Department of Transportation (DoT) for federal and state governments. Furthermore, it is to be appreciated that although the disclosure describes a Euclidean distance model as an exemplary use case for determining the color distance measurement, other color difference formulas may be used as well such as, for example, a city block model or CIELAB color space models. The system 20 also determines a marking intensity contrast ratio between the pavement 14 and the pavement markings 12.

The color distance measurement between the current and ideal marking colors provides an objective measurement indicating pavement marking paint color deterioration over time, and the marking intensity contrast ratio provides an objective measurement indicating the visibility of the pavement markings 12 against the pavement 14. Specifically, the color distance measurement between the current marking color and the ideal marking color indicates how much the current marking color of the pavement marking has deviated from the ideal marking color over time. For example, a higher Euclidean distance indicates higher levels of paint color deterioration over time for the pavement marking 12. The marking intensity contrast ratio is measured between the pavement markings 12 and the pavement 14 and provides an objective measurement of the visibility contrast between the pavement markings 12 and the pavement 14, where a higher ratio indicates greater visibility and a lower ratio indicates lower or poor visibility.

Figure 2:
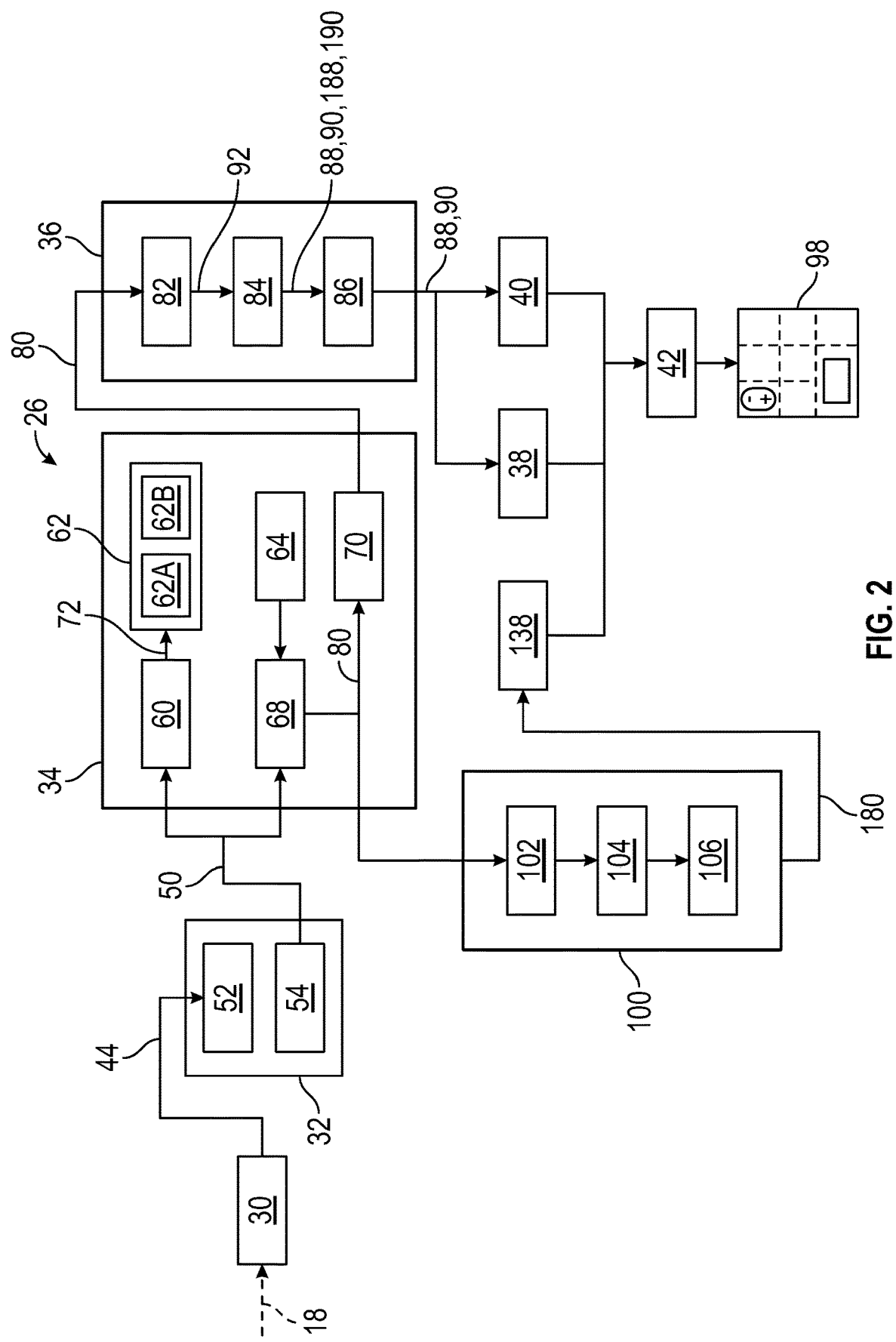
FIG. 2 is a diagram illustrating the computing system shown in FIG. 1, according to an exemplary embodiment.

FIG. 2 is a block diagram of the computing system 20 including the one or more controllers 26 for determining the color distance measurement between the current marking color and the ideal marking color and a marking intensity contrast ratio between the pavement 14 and the pavement markings 12. The computing system 20 includes a collection module 30, a preprocessing module 32, a feature extraction module 34, a filtering module 36, a Euclidean distance module 38, a contrast ratio module 40, and an assessment module 42. Referring to FIGS. 1A, 1B, and 2, the collection module 30 of the computing system 20 receives the image data 18 from the plurality of vehicles 22, where the image data 18 is representative of the pavement markings 12 for a specific patch of the roadway 16. It is to be appreciated that since the image data 18 is collected from more than one vehicle 22, multiple set of image data 18 may exist for the specific patch of the roadway 16. The image frames 44 are then sent to the preprocessing module 32 of the computing system 20.

The preprocessing module 32 performs one or more preprocessing techniques upon the image frames 44 to generate grayscale image frames 50 representative of the pavement markings 12 for the specific patch of the roadway 16 (FIG. 1B) based on the image frames 44. In the example as shown in FIG. 2, the preprocessing module 32 includes a grayscale block 52 and a brightness block 54. The grayscale block 52 converts the image frames 44, which are in color space values, into the grayscale image frames 50. It is to be appreciated that although the image frames 44 are converted to grayscale, the grayscale image frames 50 still indicate original color space values. That is, the grayscale image frames 50 retain data inside each pixel indicating the original color space values of the original image frames 44. The grayscale images frames 50 are then corrected for brightness to remove discolorations in the image data representing the pavement 14 by the brightness block 54. In one non-limiting embodiment, the brightness block 54 executes a gamma correction algorithm to remove discolorations, however, it is to be appreciated that other techniques may be used as well.

The grayscale image frames 50 corrected for brightness are then sent to the feature extraction module 34. In the example as shown in FIG. 2, the feature extraction module 34 includes a color space block 60, a color mask block 62, a common mask 64, a grayscale filter 68, and an edge detection block 70. The color space block 60 of the feature extraction module 34 converts the grayscale image frames 50 into image frames expressed in color space values 72. For example, in one embodiment, the darkened grayscale images 50 are converted into image frames where the pavement markings 12 are separated from the pavement 14 based on a common mask 64. The common mask 64 is created expressing the image frames 44 in hue, saturation, and lightness (HSL) color space values, however, it is to be appreciated that other color spaces such as, but not limited to, a hue, saturation, value (HSV), a red, blue, green (RGB) color space or a Y'UV color space may be used as well to determine color difference measurement and contrast ratio.

The image frames expressed in the color space values 72 are then sent to the color mask block 62, which includes one or more color masks to isolate the original color space values representing the pavement markings. In an embodiment, the color mask block 62 includes a first color mask 62A and a second color mask 62B, however, more than two color masks may be used as well. The first color mask 62A isolates only color space values representing a first color from the image frames expressed in the color space values 72 to create the first color mask 62A, and the second color mask 62B isolates only color space values representing a second color from the image frames expressed in the color space values 72. In an embodiment, since many pavement markings are either white or yellow, the first color is yellow, and the second color is white, and the white color mask corresponds to the white markings and the yellow color mask corresponds to the yellow markings. However, it is to be appreciated that other colors may be used as well for the first and second colors.

The first color mask 62A and the second color mask 62B are combined together to create a bitwise OR mask, which is the common mask 64, where the bitwise OR operation is implemented for creating the common mask 64 from the two-colored masks (i.e., white and yellow). The common mask 64 isolates only the color space values representing either the first color or the second color from the image frames expressed in the color space values 72, where output of the common mask 64 is combined together to create the grayscale filter 68. The grayscale filter 68 isolates the original color space values representing the first color and the second color from the grayscale image frames 50, thereby functioning as a bitwise AND mask. Thus, the grayscale filter 68 is created by first providing one or more color masks that isolate only the original color space values representing the pavement markings 12 (in the present example yellow and white), and then combining the output of the one or more color masks together (in the present example the output is all yellow or white pavement colors).

The grayscale filter 68 receives the grayscale image frames 50 representative of the pavement markings 12 for the specific patch of the roadway 16 from the preprocessing module 32 and isolates the original color space values representing the first color and the second color from the grayscale image frames 50 to determine filtered grayscale image frames 80, where the pavement markings 12 are separately visible compared to the pavement 14. In the present example, the grayspace filter 68 isolates the original color space values from the grayscale image frames 50 representing yellow and white color values, which are common colors chosen for pavement markings.

The filtered grayscale image frames 80 are then sent to the edge detection block 70. In an embodiment, the filtered grayscale image frames 80 may be filtered first using any type of image noise reduction technique such as, for example, a Gaussian blur before being sent to the edge detection block 70. Gaussian blur noise reduction techniques have been used to reduce image noise, and in the present case by reducing specs that may be visible in the pavement segment of the image frames. The edge detection block 70 identifies a boundary between the pavement markings 12 and the pavement 14 of the filtered grayscale image frames 80. For example, in an embodiment, the edge detection algorithm is the Canny edge detector, however, it is to be appreciated that other algorithms may be used as well. The filtered grayscale image frames 80 are then sent to the filtering module 36.

The filtering module 36 includes a Boolean mask 82, a first filter 84, and a second filter 86. The filtering module 36 determines mean color space values 88, 90 corresponding to the pavement markings 12 and the pavement 14 respectively based on the filtered grayscale image frames 80 received from the feature extraction module 34. Specifically, the Boolean mask 82 determines masked filtered grayscale image frames 92 by assigning binary values to pixels of the filtered grayscale image frames 80, where the pixels representing the pavement markings 12 are assigned a first binary value, and the pixels representing the pavement 14 are assigned a second binary value. For example, in an embodiment, the pixels representing the pavement markings 12 are assigned a 1, while the pixels representing the pavement 14 are assigned 0. Of course, this embodiment may be reversed so that the pavement markings 12 are assigned 0 and the pavement 14 is assigned a 1.

The first filter 84 then determines the mean color space value 88 for the pavement markings 12 and a mean color space value 90 for the pavement 14 based on the masked filtered grayscale image frames 92. Specifically, the first filter 84 determines the mean color space value 88 corresponding to the pixels for all the first binary values representing the pavement markings 12. The first filter 84 then determines the mean color space value 90 corresponding to the pixels for all the second binary values representing the pavement 14. The mean color space values 88, 90 are then sent to the second filter 86. The second filter 86 identifies a color represented by mean color space value 88 representing the pavement markings 12. For example, if the pavement markings 12 are yellow, then the second filter 86 determines the color represented by the mean color space value representing the pavement markings 12 is yellow.

The mean color space values 88, 90 and the color representing the mean color space value 88 representing the pavement markings 12 are then sent to both the Euclidean distance module 38 and the contrast ratio module 40. The Euclidean distance module 38 determines the Euclidean distance between the mean color space value 88 and an ideal marking color space value. It is to be appreciated that for calculating Euclidean distance and color space values, HSL, RGB, and Y'UV color spaces may be used. In an embodiment, the Euclidean distance is determined based on Equations 1-3, which are as follows:

$$\text{Euclidean Distance}_{RGB} = \sqrt{(LM_R - I_R)^2 + (LM_G - I_G)^2 + (LM_B - I_B)^2} \quad \text{Equation 1}$$

$$\text{Euclidean Distance}_{HSV/HSL} = \sqrt{(LM_H - I_H)^2 + (LM_S - I_S)^2 + (LM_{V/L} - I_{V/L})^2} \quad \text{Equation 2}$$

$$\text{Euclidean Distance}_{YUV} = \sqrt{(LM_Y - I_Y)^2 + (LM_U - I_U)^2 + (LM_V - I_V)^2} \quad \text{Equation 3}$$

where Equation 1 is used if the mean color space value 88 is expressed in RGB color space, Equation 2 is used if the mean color space value 88 is expressed as HSL or HSV color space values, and Equation 3 is used if the mean color space value 88 is expressed as Y'UV color space values, LM represents the mean color space value 88 of the pavement marking 12, I represents the ideal marking color, R, G, B represents values for red, green, and blue, H represents the value of hue, V represents value, L represents lightness, Y is a luma component, and U, V represent chrominance components.

The contrast ratio module 40 determines the marking intensity contrast ratio between the pavement 14 and the pavement markings 12 based on the mean color space value 88 for the pavement markings 12 and the mean color space value 90 for the pavement 14, where the mean color space values 88, 90 represent the mean intensity of the target markings. The marking intensity contrast ratio is a measure of a difference between an intensity of the pavement markings 12 and an intensity of a surrounding background area, such as the pavement 14 in the present case. Therefore, a higher value marking intensity contrast ratio indicates the pavement markings 12 are easily perceived by individuals and autonomous vehicles. In an embodiment, the marking intensity contrast ratio is determined based on a pavement marking intensity value and a pavement intensity value, and specifically by Equation 4, which is:

$$\text{marking intensity contrast ratio} = \frac{\mu_M - \mu_p}{\mu_p} \quad \text{Equation 4}$$

where $\mu_M$ is the marking intensity and $\mu_p$ is the pavement intensity.

In embodiments, the one or more controllers 26 of the system 20 receive data indicating the geographical location of the pavement markings 12. For example, in an embodiment, Global Positioning System (GPS) coordinates are included with the image data 18 transmitted to the one or more controllers 26 by the plurality of vehicles 22 (FIG.

1A). The assessment module 42 of the one or more controllers 26 creates a map 98 plotting the Euclidean distance 38 and the marking intensity contrast ratio of the pavement markings 12 for a specific geographical location, where the map 98 provides a visual indicator of pavement marking quality and visibility. For example, the map 98 may indicate where the lane markings for a specific section or length of roadway need to be restriped or repainted to improve pavement marking quality and/or visibility.

Figure 3:
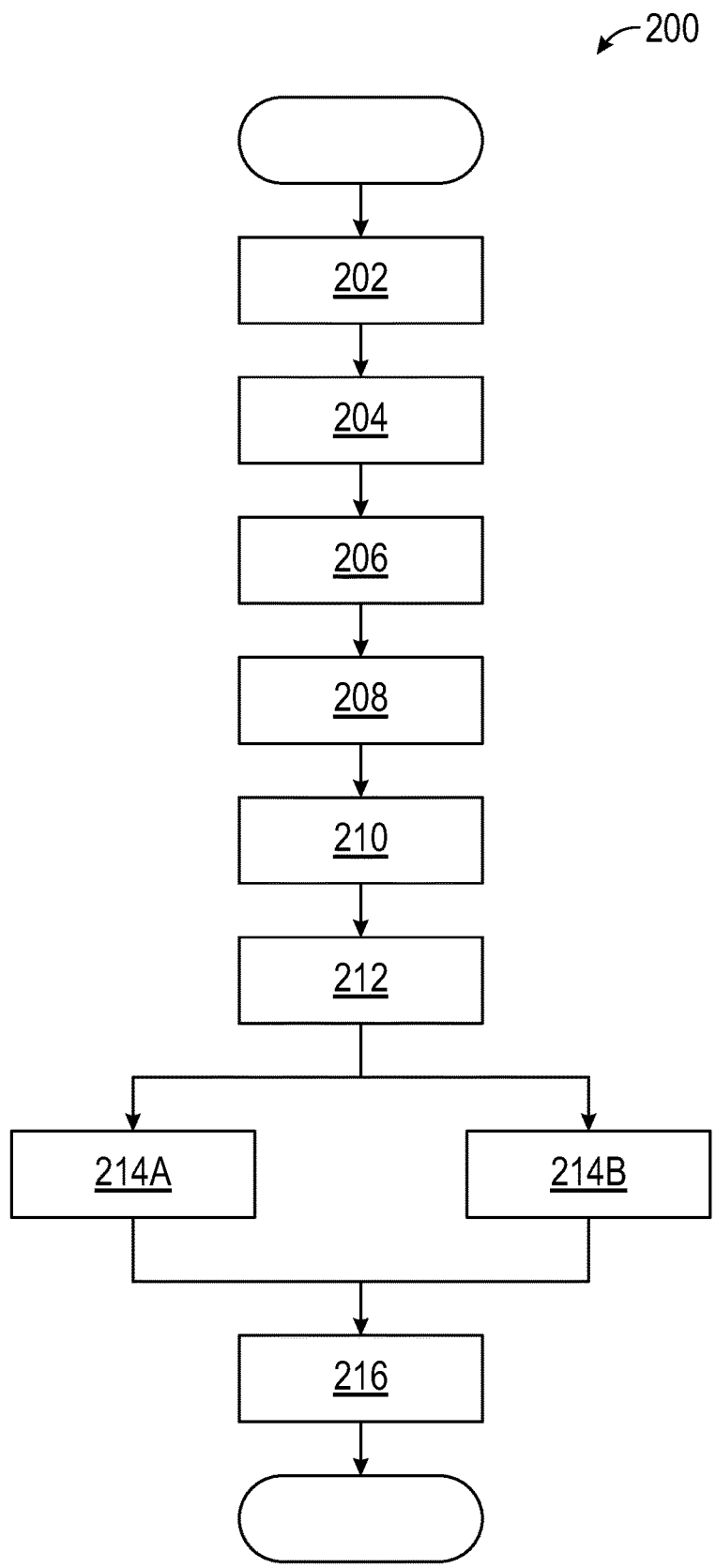
FIG. 3 is a process flow diagram illustrating a method for determining the quality of the pavement markings shown in FIG. 3A, according to an exemplary embodiment.

FIG. 3 is a process flow diagram illustrating an exemplary method 200 determining a quality of pavement markings 12 disposed along a pavement 14 of a roadway 16 (FIG. 1B). Specifically, the method 200 determines the color distance measurement between the current marking color and the ideal marking color and the marking intensity contrast ratio between the pavement 14 and the pavement markings 12. Referring generally to FIGS. 1A, 1B, 2, and 3, the method 200 begins at block 202. In block 202, the preprocessing module 30 of the one or more controllers 26 converts the image frames 44 into the grayscale image frames 50. As mentioned above, the grayscale image frames 50 retain the data indicating the original color space values of the original image frames 44. As also mentioned above, the grayscale block 52 of the preprocessing module 30 converts the image frames 44, which are in color space values, into the grayscale image frames 50, and the brightness block 54 of the preprocessing module 30 then corrects the grayscale images frames 50 for brightness to remove discolorations in the image data representing the pavement 14. The method 200 may then proceed to block 204.

In block 204, the color space block 60 of the feature extraction module 34 converts the grayscale image frames 50 into image frames expressed in color space values 72. The method 200 may then proceed to block 206.

In block 206, the feature extraction module 34 of the of the one or more controllers 26 creates the grayscale filter 68 by first providing one or more color masks that isolate only the original color space values representing the pavement markings 12, and then combining the output of the one or more color masks together. In the present example, the first color mask 62A isolates yellow and the second color mask 62B isolates white, which are common colors for pavement markings. The method 200 may then proceed to block 208.

In block 208, the grayscale filter 68 isolates the original color space values representing the pavement markings 12 from the darkened grayscale image frames 50 to determine filtered grayscale image frames 80. In the present example, the gray space filter 68 isolates the original color space values representing yellow and white color values, which are common colors chosen for pavement markings. The method 200 may then proceed to block 210.

In block 210, the edge detection block 70 of the feature extraction module 34 identifies boundaries between the pavement markings 12 and the pavement 14 of the filtered grayscale image frames 80. The method 200 may then proceed to block 212.

In block 212, the filtering module 36 determines the mean color space value 88 corresponding to the pavement markings 12 and the mean color space value 90 corresponding to the pavement 14 based on the filtered grayscale image frames 80. Specifically, as mentioned above, the Boolean mask of the filtering module 36 determines the masked filtered grayscale image frames 92 by assigning binary values to the pixels of the filtered grayscale image frames 80. The first filter 84 determines the mean color space value 88 corresponding to the pixels for all binary values representing the pavement markings 12 and the mean color space value 90 corresponding to the pixels for all binary values representing the pavement 14. The second filter 86 identifies the color represented by mean color space value representing the pavement markings 12. The method 200 may then proceed to blocks 214A and 214B.

In block 214A, the Euclidean distance module 38 determines the color distance measurement between the mean color space value 88 and the ideal marking color space value. Equations 1-3 as described above may be used to determine the Euclidean distance. In block 214B, the contrast ratio module 40 determines the marking intensity contrast ratio, which is described above in Equation 4. The method 200 may proceed to block 216.

In block 216, the one or more controllers 26 create the map 98 plotting the Euclidean distance and marking intensity contrast ratio of the pavement markings 12 for a specific geographical location, where the map 98 provides a visual indicator where the pavement markings 12 of pavement marking quality and visibility. For example, the map 98 may indicate where the pavement markings 12 for a specific section or length or roadway needs to be restriped or repainted to improve pavement marking quality and/or visibility. The method 200 may then terminate.

Referring back to FIGS. 1B and 2, in one alternative embodiment, the quality of the pavement markings 12 is determined based on a dominant color approach. Specifically, in an embodiment, system 20 further includes a dominant color module 100 that determines a dominant color space values for both the pavement markings 12 and the pavement 14. The dominant color module 100 includes a clustering block 102, a histogram block 104, and a plotting block 106.

The clustering block 102 determines the dominant color space values of the pavement markings 12 and the pavement 14 based on the original color space values of the filtered grayscale image frames 80. The dominant color module 100 determines a number N of clusters 180 that each represent a dominant color space value for either the pavement markings 12 and the pavement 14, where the number N may be any number that is at least two. Specifically, the clustering block 102 determines the number N of clusters based on the original color space values of the filtered grayscale image frames 80 for both the pavement markings 12 and the pavement 14, where a high value for the number N indicates a high variance of coloring and higher deterioration of the pavement markings 12 and the pavement 14. The histogram block 104 may then create a histogram illustrating the distribution of the N number of clusters 180 that each represent a dominant color for either the pavement markings 12 and the pavement 14. The plotting block 106 may then create a color plot illustrating all of the dominant colors in the image frames 44. All the original color space values (i.e., in RGB, HSV, or Y'UV color space) of the dominant colors of the pavement markings 12 and the pavement 14 may be presented as well.

The N number of clusters 180 each representing a dominant color space value are then sent to a Euclidean distance module 138 that determines the Euclidean distance between each dominant color space value of the pavement markings 12 and the ideal marking color space value. As mentioned above, the Euclidean distance is determined based on Equations 1-3. In an embodiment, the Euclidean distance between the dominant color space value of the pavement markings 12 and the ideal marking color space is sent to the assessment module 42. The assessment module 42 creates the map 98 plotting the Euclidean distance of the pavement markings 12 for a specific geographical location.

Referring generally to the figures, the disclosed system provides various technical effects and benefits. Specifically, the disclosed system provides an approach for quantitively determining pavement marking quality that is devoid of human perception, which in turn may lead to uniform results that are not based on the variations in color perception between different individuals. The disclosed approach allows for various municipalities and government agencies require repainting based on specific quality standards, which in turn may lower repainting costs. Finally, the disclosed approach enables exploration of the variations in color perceived in pavement markings (e.g., such as the dominant color space approach), which was not previously possible.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for quantitively determining quality for pavement markings disposed along pavement on a roadway, the system comprising:
   one or more controllers in wireless communication with a plurality of vehicles, wherein the one or more controllers receive image data represents the pavement markings disposed along the pavement collected by the plurality of vehicles, wherein the one or more controllers execute instructions to:
   convert image frames based on the image data into grayscale image frames, wherein the grayscale image frames retain data indicating original color space values of the image frames;
   create a grayscale filter by providing one or more color masks that isolate only the original color space values representing the pavement markings, and then combining the output of the one or more color masks together;
   isolate, by the grayscale filter, the original color space values representing the pavement markings from the grayscale image frames to determine filtered grayscale image frames;
   determine a mean color space value corresponding to the pavement markings and the mean color space value corresponding to the pavement based on the filtered grayscale image frames;
   determine at least one of a color distance measurement between the mean color space value of the pavement markings and an ideal marking color space value and a marking intensity contrast ratio between the pavement markings and the pavement;
   determine dominant color space values of the pavement markings and the pavement based on the original color space values of the filtered grayscale image frames;
   determine a number of clusters each representing a dominant color space value for the pavement markings and the pavement; and
   determine a Euclidean distance between the mean color space value for each dominant color space value of the pavement markings and the ideal marking color space value.

2. The system of claim 1, wherein the one or more controllers execute instructions to:
   filter, by a Boolean mask, masked filtered grayscale image frames by assigning binary values to pixels of the filtered grayscale image frames, wherein the pixels representing the pavement are assigned to first binary values and the pixels representing the pavement are assigned to second binary values.

3. The system of claim 2, wherein the one or more controllers execute instructions to:
   determine the mean color space value for the pixels of the first binary values representing the pavement markings;
   determines the mean color space value for the pixels of the second binary values representing the pavement; and
   identify a color represented by the mean color space value representing the pavement markings.

4. The system of claim 1, wherein the one or more controllers identifies boundaries between the pavement markings and the pavement of the filtered grayscale image frames.

5. The system of claim 1, wherein the one or more controllers execute instructions to:
   correct the grayscale images frames for brightness to remove discolorations in the image data representing the pavement of the roadway.

6. The system of claim 1, wherein the one or more color masks include a first color mask isolating only color space values representing a first color and a second color mask isolating only color space values representing a second color.

7. The system of claim 6, wherein the first color is yellow and the second color is white.

8. The system of claim 1, wherein the marking intensity contrast ratio is determined by:

$$\text{marking intensity contrast ratio} = \frac{\mu_M - \mu_p}{\mu_p}$$

where $\mu_M$ is a marking intensity and $\mu_p$ is a pavement intensity.

9. The system of claim 1, wherein the one or more controllers execute instructions to:
   create a map plotting the color distance measurement of the pavement markings for a specific geographical location, wherein the map provides a visual indicator where the pavement markings require repainting.

10. The system of claim 1, wherein the pavement markings are lane markings.

11. A method for quantitively determining quality for pavement markings disposed along pavement on a roadway, the method comprising:

receive, by one or more controllers, image data representing the pavement markings disposed along the pavement collected by a plurality of vehicles;

converting, by the one or more controllers, image frames based on the image data into grayscale image frames, wherein the grayscale image frames retain data indicating original color space values of the image frames;

creating a grayscale filter by providing one or more color masks that isolate only the original color space values representing the pavement markings, and then combining the output of the one or more color masks together;

isolating, by the grayscale filter, the original color space values representing the pavement markings from the grayscale image frames to determine filtered grayscale image frames;

determining a mean color space value corresponding to the pavement markings and the mean color space value corresponding to the pavement based on the filtered grayscale image frames;

determining at least one of a color distance measurement between the mean color space value of the pavement markings and an ideal marking color space value and a marking intensity contrast ratio between the pavement markings and the pavement;

determining dominant color space values of the pavement markings and the pavement based on the original color space values of the filtered grayscale image frames;

determining a number of clusters each representing a dominant color space value for the pavement markings and the pavement; and determining a Euclidean distance between the mean color space value for each dominant color space value of the pavement markings and the ideal marking color space value.

12. The method of claim 11, wherein the method comprises:

filtering, by a Boolean mask, masked filtered grayscale image frames by assigning binary values to pixels of the filtered grayscale image frames, wherein the pixels representing the pavement are assigned to first binary values and the pixels representing the pavement are assigned to a second binary values.

13. The method of claim 12, wherein the method comprises:

determining the mean color space value for the pixels of the first binary values representing the pavement markings;

determining the mean color space value for the pixels of the second binary values representing the pavement; and identifying a color represented by the mean color space value representing the pavement markings.

14. The method of claim 11, wherein the method comprises:

identifying boundaries between the pavement markings and the pavement of the filtered grayscale image frames.

15. The method of claim 11, wherein the method comprises:

correcting the grayscale images frames for brightness to remove discolorations in the image data representing the pavement of the roadway.

16. The method of claim 11, wherein the method comprises:

determining the marking intensity contrast ratio is determined by:

$$\text{marking intensity contrast ratio} = \frac{\mu_M - \mu_p}{\mu_p}$$

where $\mu_M$ is a marking intensity and $\mu_p$ is a pavement intensity.

17. The method of claim 11, wherein the method comprises:

creating a map plotting the color distance measurement of the pavement markings for a specific geographical location, wherein the map provides a visual indicator where the pavement markings require repainting.

18. A system for quantitively determining quality for lane markings disposed along pavement on a roadway, the system comprising:

one or more controllers in wireless communication with a plurality of vehicles, wherein the one or more controllers receive image data represents the lane markings disposed along the pavement collected by the plurality of vehicles, wherein the one or more controllers execute instructions to:

convert image frames based on the image data into grayscale image frames, wherein the grayscale image frames retain data indicating original color space values of the image frames;

create a grayscale filter by providing one or more color masks that isolate only the original color space values representing the lane markings, and then combining the output of the one or more color masks together;

isolate, by the grayscale filter, the original color space values representing the lane markings from the grayscale image frames to determine filtered grayscale image frames;

determine a mean color space value corresponding to the lane markings and the mean color space value corresponding to the pavement based on the filtered grayscale image frames;

determine at least one of a first Euclidean distance between the mean color space value of the lane markings and an ideal marking color space value and a marking intensity contrast ratio between the lane markings and the pavement;

determine dominant color space values of the lane markings and the pavement based on the original color space values of the filtered grayscale image frames;

determine a number of clusters each representing a dominant color space value for the lane markings and the pavement; and determine a second Euclidean distance between the mean color space value for each dominant color space value of the lane markings and the ideal marking color space value.

19. The system of claim 18, wherein the one or more controllers execute instructions to:

filter, by a Boolean mask, masked filtered grayscale image frames by assigning binary values to pixels of the filtered grayscale image frames, wherein the pixels representing the pavement are assigned to first binary values and the pixels representing the pavement are assigned to second binary values.

20. The system of claim 19, wherein the one or more controllers execute instructions to:

determine the mean color space value for the pixels of the first binary values representing the lane markings;

determines the mean color space value for the pixels of the second binary values representing the pavement; and identify a color represented by the mean color space value representing the lane markings.

\* \* \* \* \*